(No Model.)
A. P. SEILER.
BICYCLE HOLDER.
No. 330,430. Patented Nov. 17, 1885.
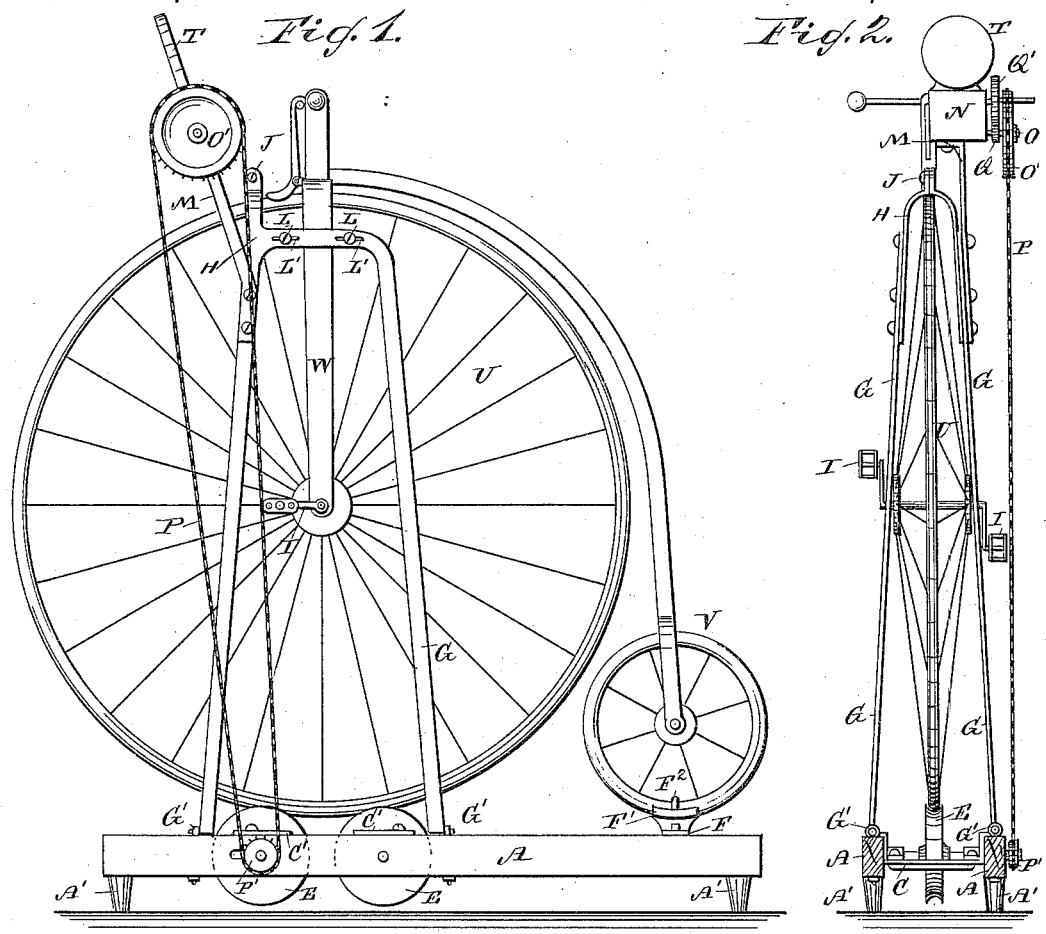
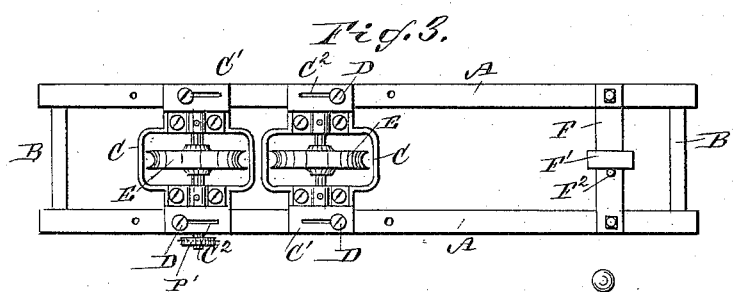
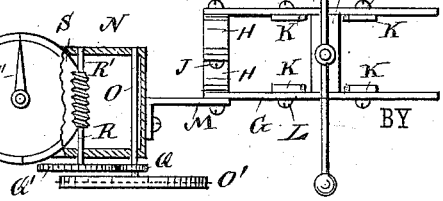
WITNESSES:
INVENTOR:
A. P. Seiler
BY Munn & Co
ATTORNEYS.

UNITED STATES PATENT OFFICE.

ALBERT P. SEILER, OF MANSFIELD, OHIO.

BICYCLE-HOLDER.

SPECIFICATION forming part of Letters Patent No. 330,430, dated November 17, 1885.

Application filed March 25, 1885. Serial No. 160,053. (No model.)

*To all whom it may concern:*

Be it known that I, ALBERT P. SEILER, of Mansfield, in the county of Richland and State of Ohio, have invented a new and Improved Bicycle-Holder, of which the following is a full, clear, and exact description.

The object of my invention is to provide a new and improved frame or holder for holding a bicycle in such a manner that the rider can operate the bicycle in the same manner as on the road, and whereby the rider can exercise himself to increase his speed on the road or to strengthen his muscles.

The invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a side view of my bicycle-holder and a bicycle in the same. Fig. 2 is a cross-section of the same. Fig. 3 is a plan view of the bottom frame. Fig. 4 is a detail plan view of the top part, parts broken out and others in section.

Two parallel base-bars, A, provided with legs A', are united by cross-pieces B. On the said bars two yokes, C, are placed, provided with plates C', resting on the bars A and having longitudinal slots C², through which screws D are passed into the bars A and hold the yokes in place, at the same time permitting of adjusting the said yokes a greater or less distance from each other. In each yoke a grooved roller, E, is journaled. A cross-piece, F, is held adjustably on the bars A, and is provided with a support, F', having a hook, F². On the top edge of each bar A the ends of the shanks of a U-shaped frame, G, are hinged by hook-bolts G' to swing toward and from each other, and each frame G is provided with an upwardly-projecting arm, H, the upper ends of which are united by a screw, J.

On the inner surface of the cross-piece of each frame G two rubber-blocks, K, are held adjustably by screws L, passed through slots L' in the said cross-piece. From one frame G an arm, M, projects upward, on the upper end of which a box, N, is secured. A shaft, O, is journaled in the box N, and on one end of the same a sprocket-wheel, O', is mounted, over which an endless chain, P, passes, which also passes over a like pulley or wheel, P', on one end of the shaft of the front roller or pulley E. On the shaft O a pinion, Q, is mounted which engages with a cog-wheel, Q', on a shaft, R, in the box, provided with a worm, R', engaging with a worm-wheel, S, provided with a pointer, S', arranged to revolve over a dial, T, on the box N, and in front of the rider. If desired, the brace G may be shaped differently, according to the shape of the velocipede, so that such velocipedes as the "Star" can be held in this apparatus.

The operation is as follows: The screw J is removed, the frames G are swung from each other, and the bicycle placed between the frames in such a manner that the front wheel, U, rests upon the grooved pulleys or rollers E, and the rear or steering wheel, V, upon the support F', upon which it is held by the hook-bolt F². The frames G are swung together, and the arms H are locked together by means of the screw J. The top cross-pieces of the frames G rest against the sides or shanks of the forks W of the bicycle, the rubber blocks K being at the sides of the shanks of the fork and preventing the bicycle from moving forward, at the same time permitting it to move up or down in case there is any unevenness in the rim. The bicycle is thus held erect and cannot topple over. The rider mounts the bicycle in the usual manner and revolves the large wheel U by means of the treadles I. Thereby the pulleys E are revolved, and from the front pulley, E, the pulley O' is revolved by means of the chain P, and from the wheel O' the pointer S' is revolved by means of the intermediate gearing. The distance the bicycle would have traveled on the ground is shown by the hand S' on the dial T.

The device can be adjusted very easily for larger or smaller bicycles, as may be desired.

Having thus described my invention, what I claim as new, and desire to secure by Letters Patent, is—

1. The combination, with a base, of rollers held on the same and of upwardly-projecting frames hinged on the base and serving to hold a bicycle, substantially as herein shown and described.

2. The combination, with a base, of rollers held on the same, upwardly-projecting frames hinged on the base, a distance-recording device on one frame, and an endless chain passing from the base to a pulley on the indicator, substantially as herein shown and described.

3. The combination, with the base-bars A, of the rollers or pulleys E, the hinged upwardly-projecting frames G, and the rubber blocks K on the same, substantially as herein shown and described.

4. The combination, with the base-bars A, of the rollers or pulleys E, the frames G, the arms H on the same, and the screw J, substantially as herein shown and described.

5. The combination, with the base-bars A, of the rollers or pulleys E, the cross-piece F, the support F', and the frames G, substantially as herein shown and described.

6. The combination, with the base-bars A, of the adjustable yokes C, the rollers in the same, and of the frames G, substantially as herein shown and described.

ALBERT P. SEILER.

Witnesses:
A. J. GILBERT,
DAVID HURST.